United States Patent
Wang et al.

(10) Patent No.: US 11,170,149 B2
(45) Date of Patent: Nov. 9, 2021

(54) PLACEMENT CONSTRAINT METHOD FOR MULTIPLE PATTERNING OF CELL-BASED CHIP DESIGN

(71) Applicant: Taiwan Semiconductor Manufacturing Co., Ltd., Hsinchu (TW)

(72) Inventors: Shao-Huan Wang, Hsinchu (TW); Sheng-Hsiung Chen, Hsinchu (TW); Fong-Yuan Chang, Hsinchu (TW); Po-Hsiang Huang, Tainan (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 16/690,578

(22) Filed: Nov. 21, 2019

(65) Prior Publication Data

US 2020/0089840 A1 Mar. 19, 2020

Related U.S. Application Data

(62) Division of application No. 15/099,780, filed on Apr. 15, 2016, now Pat. No. 10,521,545.

(51) Int. Cl.
*G06F 30/398* (2020.01)
*G03F 1/36* (2012.01)
*G06F 119/18* (2020.01)

(52) U.S. Cl.
CPC ............. *G06F 30/398* (2020.01); *G03F 1/36* (2013.01); *G06F 2119/18* (2020.01)

(58) Field of Classification Search
CPC .......... G06F 1/36; G06F 30/39; G06F 30/392; G06F 30/398; G06F 2219/18; G06F 2119/18; Y02P 90/02
USPC .................................. 716/110, 112, 119, 54
See application file for complete search history.

(56) References Cited

U.S. PATENT DOCUMENTS

| 9,026,971 | B1 * | 5/2015 | Ho ........................ G06F 30/398 716/112 |
| 2013/0086543 | A1 * | 4/2013 | Agarwal ............... G06F 30/392 716/119 |
| 2015/0279733 | A1 * | 10/2015 | Ferrer ................. H01L 21/7684 257/734 |

(Continued)

*Primary Examiner* — Paul Dinh
(74) *Attorney, Agent, or Firm* — Sterne, Kessler, Goldstein & Fox P.L.L.C.

(57) ABSTRACT

A method for outputting a first number of subsets of a layer pattern comprising a plurality of cells arranged in a row includes selecting subsets of cells from the plurality of cells, constructing a graph representation for each subset of cells, identifying graph representations that are not colorable with a first number of labels, identifying subsets of cells that correspond to the identified graph representations, changing a distance between cells in each of the identified subset of cells, wherein the changed distances are greater than the first spacing, labeling the graph representations with the first number of labels, and outputting subsets of the layer pattern to a machine readable storage medium for manufacturing a set of masks that is used to form a single, patterned layer. Each subset of the layer pattern represents a separate mask pattern and includes features of the layer pattern corresponding to a label in the labeled graph representations.

20 Claims, 13 Drawing Sheets

(56) References Cited

U.S. PATENT DOCUMENTS

2016/0141021 A1* 5/2016 Mojumder .......... H01L 27/0688
  365/154
2016/0293496 A1* 10/2016 Kim .................. H01L 27/11807
2017/0287900 A1* 10/2017 Balakrishnan .... H01L 29/78642

* cited by examiner

PLACEMENT CONSTRAINT METHOD FOR MULTIPLE PATTERNING OF CELL-BASED CHIP DESIGN

CROSS-REFERENCE TO RELATED APPLICATION

This application is a divisional of U.S. patent application Ser. No. 15/099,780 (issuing as U.S. Pat. No. 10,521,545), titled "Placement Constraint Method for Multiple Patterning of Cell-Based Chip Design," which was filed on Apr. 15, 2016 and is incorporated herein by reference in its entirety.

BACKGROUND

Semiconductor technologies are continually progressing to smaller feature sizes, for example down to feature sizes of 22 nanometers (nm) and below. A patterned photoresist layer used to produce such small feature sizes typically has a high aspect ratio. However, maintaining a desired critical dimension (CD) can be very difficult for various reasons, especially for a resist layer with a high aspect ratio. Thus, multiple patterning techniques, such as using two or more masks per layer pattern, have been introduced to form various features with smaller dimensions. However, not all layer patterns can be resolved into a predefined number of masks.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
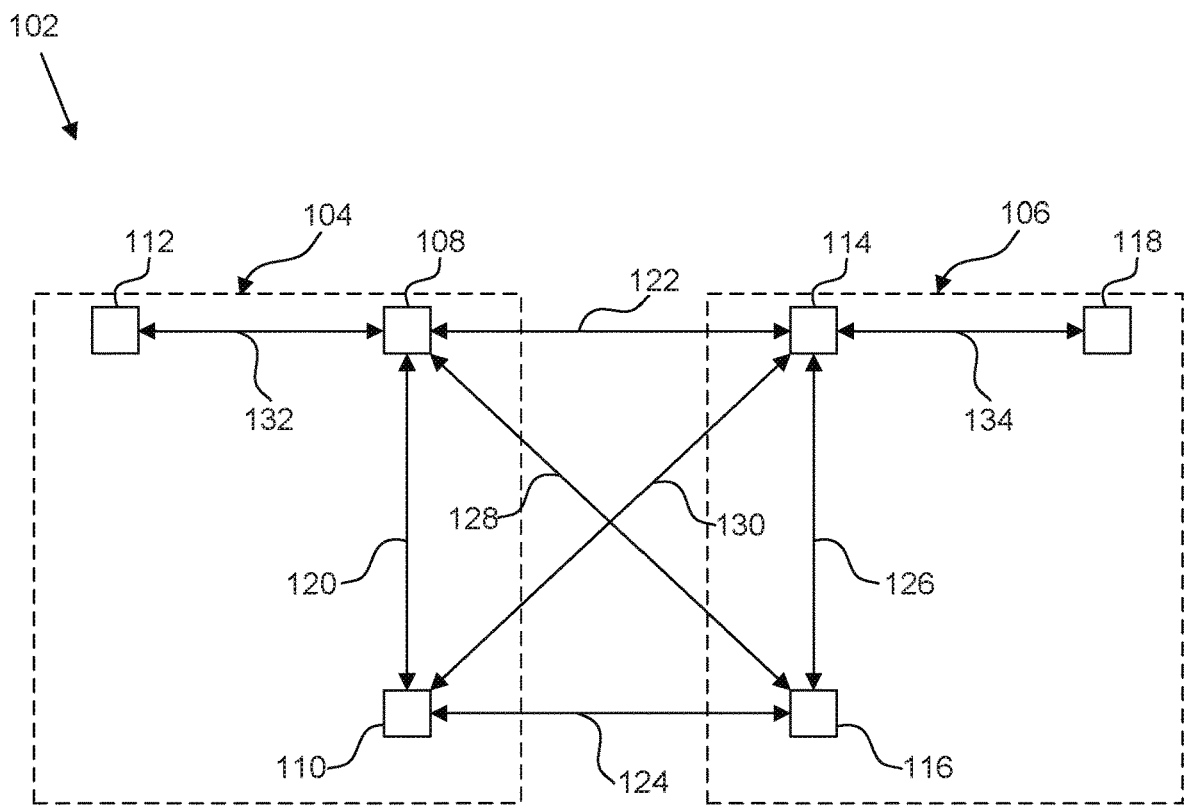
FIG. 1A illustrates a layer pattern of a layout, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "left," "right," "up," "down" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

First Exemplary Embodiment

FIG. 1A illustrates layer pattern 102 of a layout. Layer pattern 102 includes first cell 104 and second cell 106. First cell 104 and/or second cell 106 may be standard cells or custom-designed cells, from a library of cells. First cell 104 includes first feature 108, second feature 110, and third feature 112, and second cell 106 includes fourth feature 114, fifth feature 116, and sixth feature 118. Spacings 120, 122, 124, 126, 128, 130, 132, and 134 are spacings that separate two features in layer pattern 102. Spacings 120, 122, 124, 126, 128, and 130 are equal to or less than a minimum coloring spacing (MCS), while spacings 132 and 134 are greater than the MCS.

The MCS is a parameter of a particular process technology node. It is the minimum distance that is needed between features such that the features may be patterned using a single mask and exposure. In other words, features separated by a spacing that is less than or equal to the MCS may not be patterned using a single mask and exposure and may require multiple patterning. The MCS may depend on the materials used for metal trace patterns on different levels above the substrate, on the material used for metal vias connecting the metal trace patterns between levels, and on the dimensions of the metal vias. In one example, two square vias each having dimensions of 32 nm×32 nm may have a corner-to-corner MCS of 120 nm. In another example, one square via having dimensions of 32 nm×32 nm and one slot via having dimensions of 32 nm×82 nm may have an MCS of 200 nm. If the corner-to-corner spacing between two vias is less than the MCS, then the two vias should be printed using different masks.

Figure 1B:
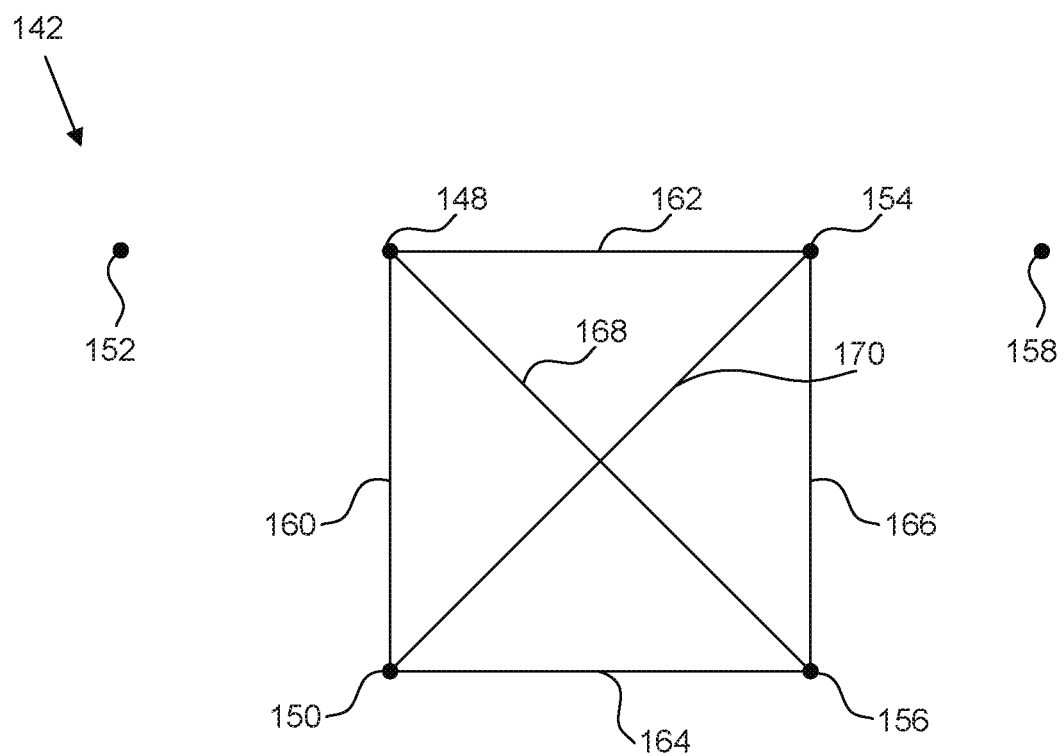
FIG. 1B is a graph representation of the layer pattern of FIG. 1A, in accordance with some embodiments.

FIG. 1B is a graph representation 142 of layer pattern 102, in accordance with some embodiments. Each feature of layout pattern 102 is represented as a vertex, and spacings between features that are less than or equal to the MCS are represented as edges. Therefore, vertices 148, 150, 152, 154, 156, and 158 represent features 108, 110, 112, 114, 116, and 118 of FIG. 1A, respectively, and edges 160, 162, 164, 166, 168, and 170 represent spacings 120, 122, 124, 126, 128, and 130 of FIG. 1A, respectively. Spacings 132 and 134 of FIG. 1A are not represented as edges in graph representation 142 since these spacings are greater than the MCS.

Still referring to FIG. 1B, k-colorability of graph representation 142 determines whether the corresponding layer pattern 102 can be decomposed into k number of masks used for multiple patterning of a single layer pattern. A k-colorable graph representation indicates that the corresponding layer pattern may be decomposed into k-number of masks, while a graph representation that is not k-colorable indicates that the corresponding layer pattern may not be decomposed into k number of masks.

A graph representation is k-colorable if it is possible to assign one of k colors to vertices such that every vertex has a color that is different from adjacent vertices. The act of assigning a color to a vertex is typically referred to as "coloring." The number k defines the number of colors that are available for assignment.

The terms "color" and "coloring" are terms that are typically used in the field of graph theory to refer to a label and an act of assigning labels, respectively. Any label including numbers, texts, and/or symbols may be used to represent a "color."

Coloring of a graph representation may be computed using any graph coloring algorithm. However, obtaining a minimal graph coloring is an NP-complete problem. Thus, the time required to determine a graph coloring may be exponentially related to the size of the graph and may be impractical to compute for graph representation of a large layout, such as a layout of an entire microprocessor or a layout of an entire array of cells.

Graph representation 142 of FIG. 1B is not 3-colorable. In other words, it is not possible to assign one of three colors to vertices such that every vertex has a color that is different from adjacent vertices. An adjacent vertex of a vertex v is a vertex that is connected to v by an edge. For example, if vertices 148, 150, and 154 are assigned a first color, a second color, and a third color, respectively, it is not possible to assign one of the three colors to vertex 156. The first color cannot be assigned to vertex 156 since vertex 156 is connected to vertex 148 by edge 168, the second color cannot be assigned to vertex 156 since vertex 156 is connected to vertex 150 by edge 164, and the third color cannot be assigned to vertex 156 since vertex 156 is connected to vertex 154 by edge 166. Since graph representation 142 is not 3-colorable, layer pattern 102 cannot be decomposed into three masks, and triple patterning of layer pattern 102 is not possible.

Figure 2A:
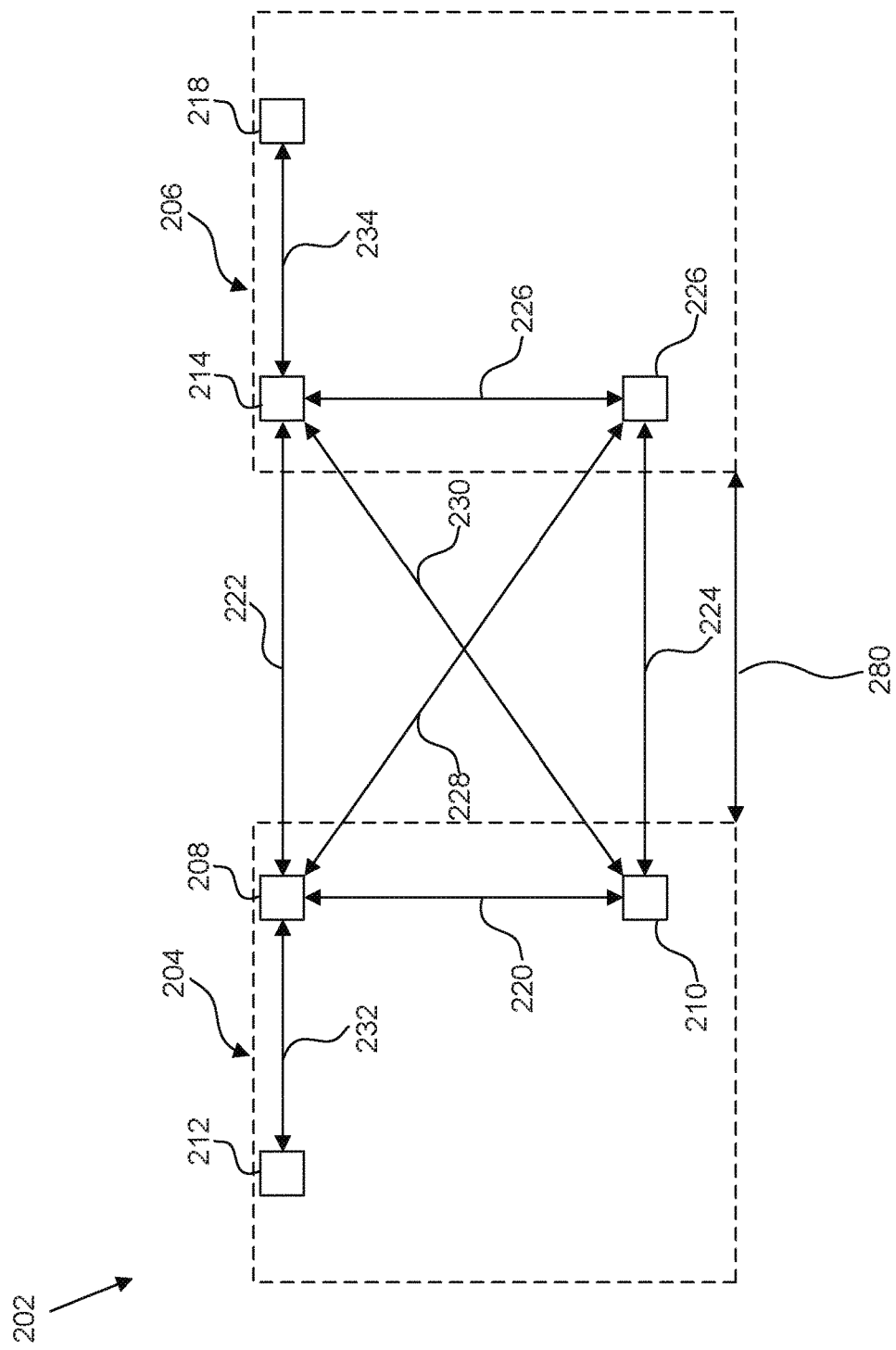
FIG. 2A illustrates another layer pattern, in accordance with some embodiments.

FIG. 2A illustrates another layer pattern 202. Layer pattern 202 is similar to layer pattern 102 of FIG. 1A except that gap 280 is inserted between first and second cells 204 and 206 such that spacings 222, 224, 228, and 230 are greater than the MCS. Gap 280 may cause layer pattern 202 to be larger than layer pattern 102.

Figure 2B:
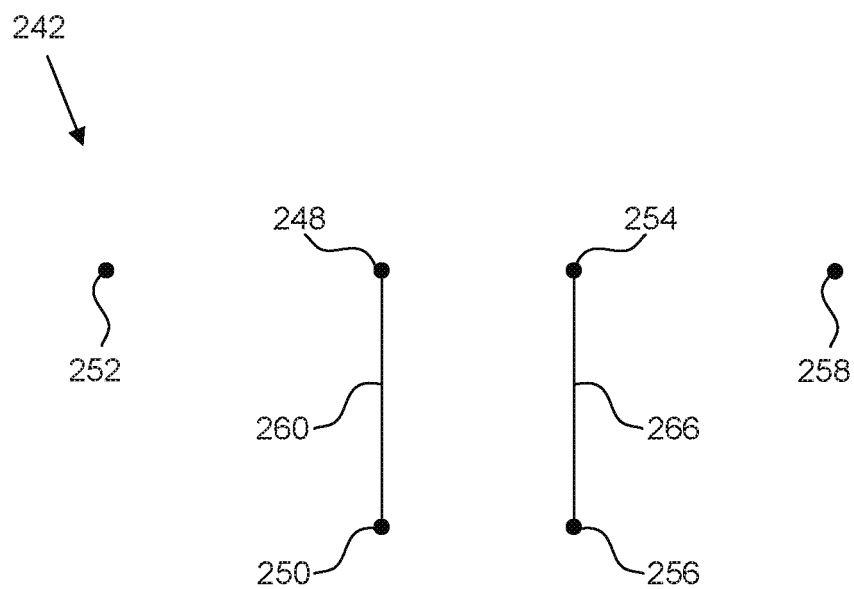
FIG. 2B is a graph representation of the layer pattern of FIG. 2A, in accordance with some embodiments.

FIG. 2B illustrates graph representation 242 of layer pattern 202 of FIG. 2A, in accordance with some embodiments. Similar to graph representation 142 of FIG. 1B, each feature of layout pattern 202 is represented as a vertex in graph representation 242, and any spacing between features that is less than or equal to the MCS is represented as an edge. Therefore, vertices 248, 250, 252, 254, 256, and 258 represent features 208, 210, 212, 214, 216, and 218 of FIG. 1A, respectively, and edges 260 and 266 represent spacings 220 and 226 of FIG. 2A, respectively. Spacings 222, 224, 228, and 230 of FIG. 2A are not represented as edges in graph representation 242 since these spacings are greater than the MCS as a result of gap 280 between first cell 204 and second cell 206. Spacings 232 and 234 of FIG. 2A are not represented as edges in graph representation 242 since these spacings are greater than the MCS with or without gap 280.

Graph representation 242 is 3-colorable, in contrast to graph representation 142 of FIG. 1A. In other words, it is possible to assign one of three colors to vertices such that every vertex has a color that is different from adjacent vertices. For example, vertices 248 and 250 may be assigned a first color and a second color, respectively, and vertices 254 and 256 may be assigned a third color and the first color, respectively. In fact, graph representation 242 is also 2-colorable. For example, vertices 248 and 250 may be assigned a first color and a second color, respectively, and vertices 254, and 256 may be assigned the first color and the second color, respectively.

Graph representations 142 and 242 of FIGS. 1B and 2B may be generated using an algorithm executed on a processor. In an embodiment, additional algorithms may be performed before and/or after generating a graph representation of a layout. For example, a fracturing algorithm that splits a single feature into a plurality of features may be performed on the layout prior to generating the graph representation. More specifically, polygonal features of a layout may be fractured into a set of non-overlapping rectangles using a sliver-minimizing fracturing algorithm.

Figure 3:
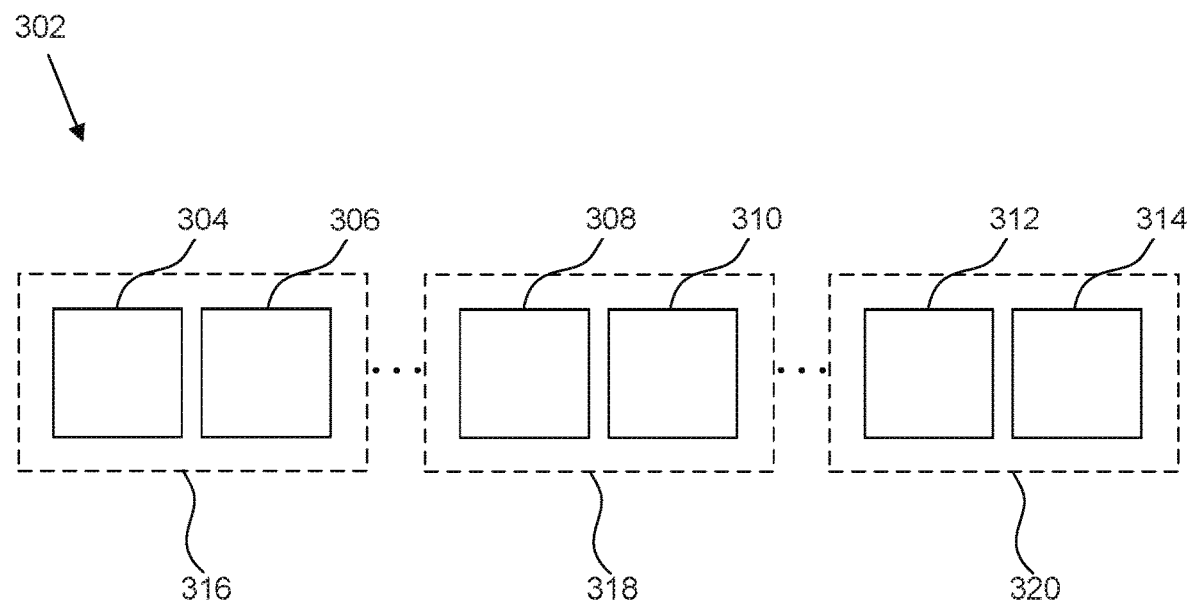
FIG. 3 illustrates a layer pattern, in accordance with some embodiments.

FIG. 3 illustrates a layer pattern 302. Layer pattern 302 includes six cells 304, 306, 308, 310, 312, and 314 that are arranged in a single row.

Two methods for determining whether a layer pattern with three or more cells may be decomposed into k number of masks are described herein. The first method is to generate a single graph representation of all cells in the layer pattern and determine k-colorability of the generated graph representation, in accordance with some embodiments. For example, a single graph representation of layer pattern 302 may be generated, and 3-colorability is determined for the generated graph representation.

The second method is to generate a plurality of graph representations, each graph representation corresponding to a subset of a layer pattern, and determine k-colorability of the plurality of generated graph representations as described above in reference to FIGS. 1A, 1B, 2A, and 2B, in accordance with an embodiment. Every cell in layer pattern 302 should be included in at least one of the subsets. For example, as illustratively shown in FIG. 3, layer pattern 302 may include subsets 316, 318, and 320, wherein subset 316 includes cells 304 and 306, subset 318 includes cells 308 and 310, and subset 320 includes cells 312 and 314. Graph representations corresponding to subsets 316, 318, and 320 are generated, and 3-colorability of the generated graph representations are determined. If all graph representations are 3-colorable, layer pattern 302 may be decomposed into three masks.

In the embodiment of FIG. 3, a subset includes a pair of cells. However, a subset may include a plurality of cells, and subsets may include different numbers of cells, in accordance with some embodiments.

As described above, the time required to color a graph representation may be exponentially related to the size of the graph representation. Therefore, the second method is computationally less intensive compared to the first method.

Figure 4:
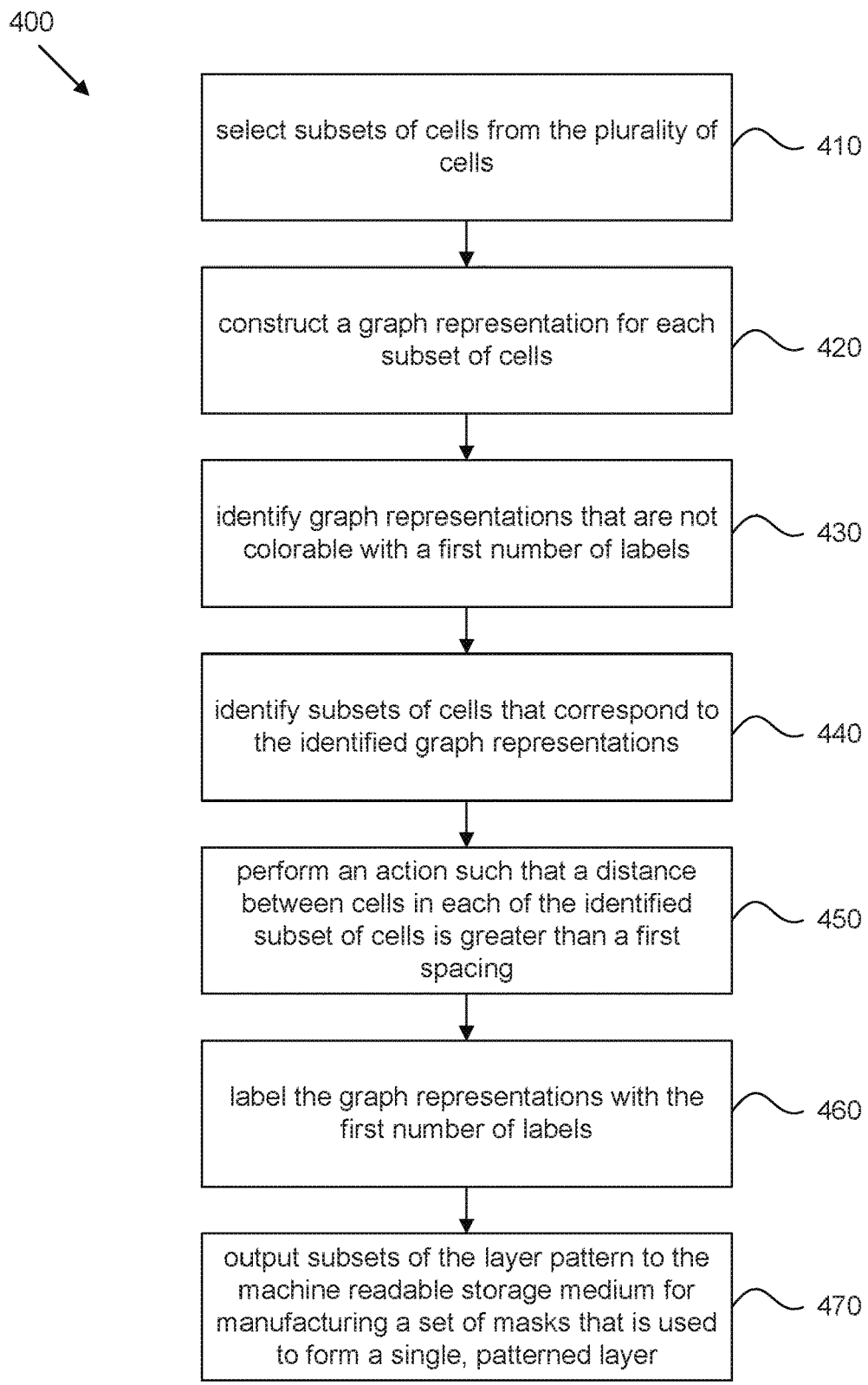
FIG. 4 is a flow diagram of an exemplary process for determining colorability of a layout and outputting a first number of subsets of a layer pattern to a machine readable medium, in accordance with some embodiments.

FIG. 4 illustrates an example process 400 for determining k-colorability of a layout comprising a plurality of cells arranged in a row and outputting k subsets of a layer pattern to a machine readable storage medium. The method is similar to the second method described above with reference to FIG. 3.

In operation 410, subsets of cells from the plurality of cells are selected. In operation 420, a graph representation for each subset of cells is constructed (see FIG. 2B). In operation 430, k-colorability of the graph representations constructed in operation 420 are determined. In operation 440, subsets of cells that correspond to graph representations that are not k-colorable are identified. In operation 450, distances between cells in each of the identified subset of cells are changed such that the changed distances are greater than the MCS (see FIG. 3). In operation 460, the graph representations are colored with the k-number of colors. In operation 470, subsets of the layer pattern are outputted to the machine readable storage medium. The outputted data is used for manufacturing a set of masks that is used to form a single, patterned layer, wherein each subset of the layer pattern represents a separate mask pattern and comprises features of the layer pattern corresponding to a color in the colored graph representations (see FIG. 2B) generated in operation 420 and/or modified in operation 450.

Second Exemplary Embodiment

A graph representation of a layout that contains a cycle has the potential not to be k-colorable. Thus, it may be beneficial to arrange cells in a layout such that a corresponding graph representation does contain any cycle. The term "cycle" is defined as a sequence of alternating vertices and edges that begin and end at the same vertex.

A graph representation that contains an odd cycle is not 2-colorable. Therefore, a layout corresponding to such a graph representation cannot be double patterned. An odd cycle is defined as a cycle that contains an odd number of vertices.

Figure 5A:
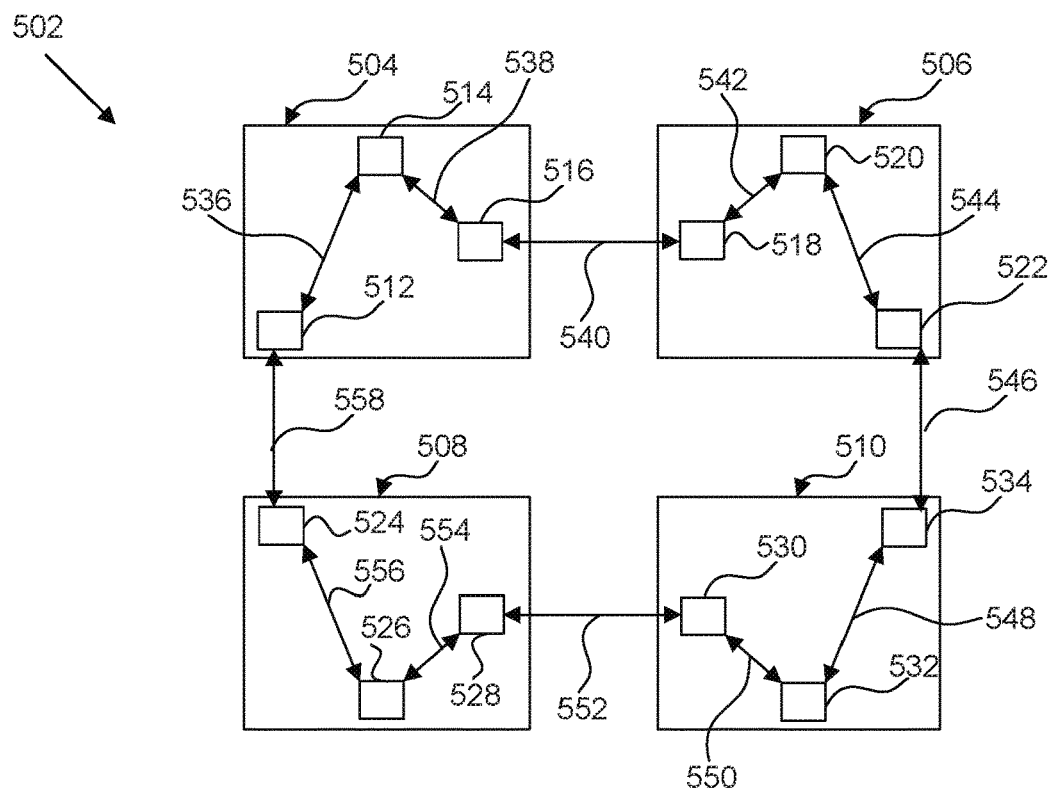
FIG. 5A illustrates a layer pattern that includes a cycle, in accordance with some embodiments.

FIG. 5A illustrates a layer pattern 502 that includes a cycle. Layer pattern 502 includes four cells 504, 506, 508, and 510 that are arranged in a two-by-two array. First cell 504 includes features 512, 514, and 516, second cell 506 includes features 518, 520, and 522, third cell 508 includes features 524, 526, and 528, and fourth cell 510 includes features 530, 532, and 534. Spacings 536, 538, 540, 542, 544, 546, 548, 550, 552, 554, 556, and 558 are less than or equal to the MCS.

Figure 5B:
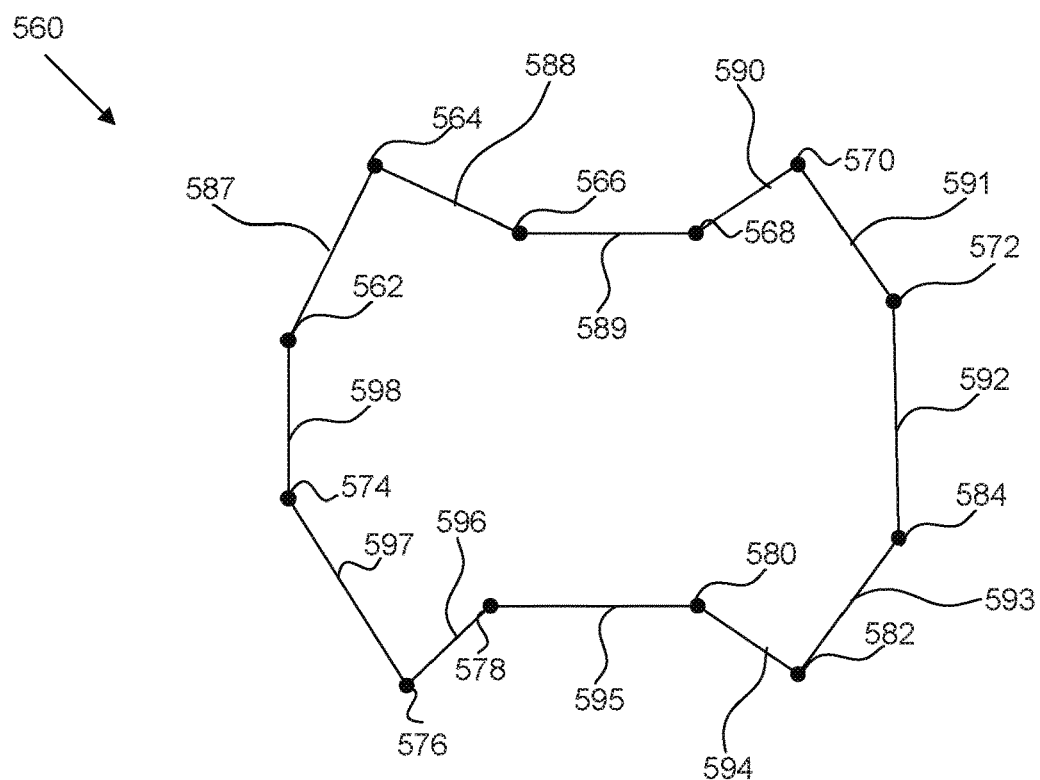
FIG. 5B is a graph representation of the layer pattern of FIG. 5A, in accordance with some embodiments.

FIG. 5B illustrates graph representation 560 of layer pattern 502 of FIG. 5A, in accordance with some embodiments. Similar to graph representation 142 of FIG. 1B, each feature of layer pattern 502 is represented as a vertex in graph representation 142, and any spacing between features that is less than or equal to the MCS is represented as an edge. Graph representation 560 includes a cycle that includes vertices 562, 564, 566, 568, 570, 572, 574, 576, 578, 580, 582, and 584, and edges 587 through 598. The presence of the cycle may cause layer pattern 502 not to be k-colorable.

Figure 6A:
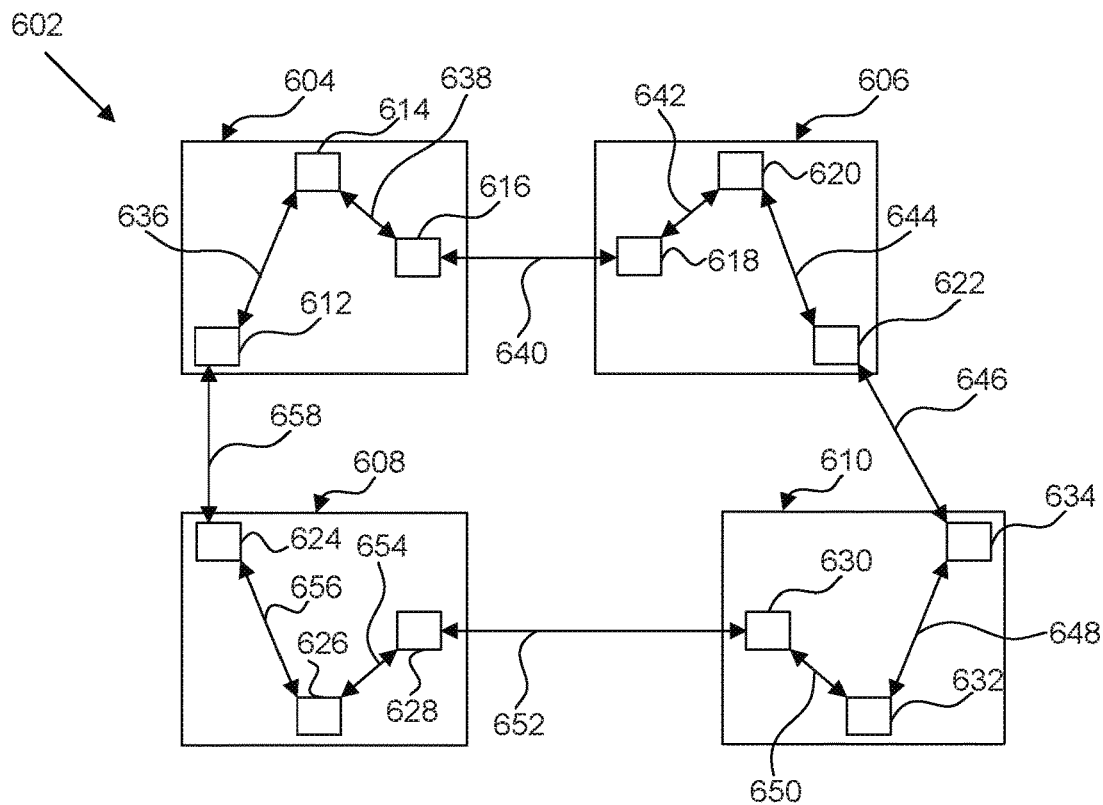
FIG. 6A illustrates a layout that is similar to the layout of FIG. 5A, except that a gap is added, in accordance with some embodiments.
Figure 6B:
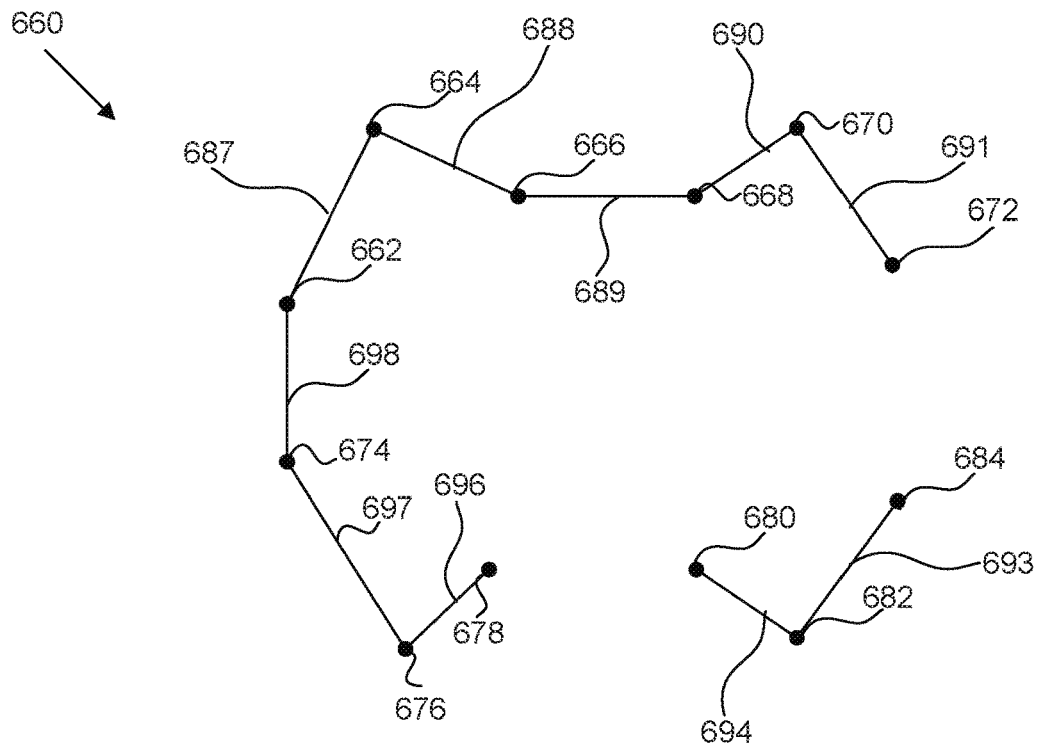
FIG. 6B is a graph representation of the layout of FIG. 6A, in accordance with some embodiments.

FIG. 6A illustrates a layout 602 that is similar to layer pattern 502 of FIG. 5A, except that gap 652 is inserted between third cell 608 and fourth cell 610 such that spacings 652 and 646 are greater than the MCS. FIG. 6B illustrates graph representation 660 of layer pattern 602 of FIG. 6A. Since spacings 652 and 646 are greater than the MCS, the cycle of FIG. 5B does not exist in graph representation 660.

In an alternative to inserting gap 652, third cell 608 may be replaced with an alternative version of third cell 608 or another cell, in accordance with some embodiments. For example, a standard cell library that includes third cell 608 may include another version of third cell 608 that has a different layout from third cell 608 but has the same functionality.

Figure 7:
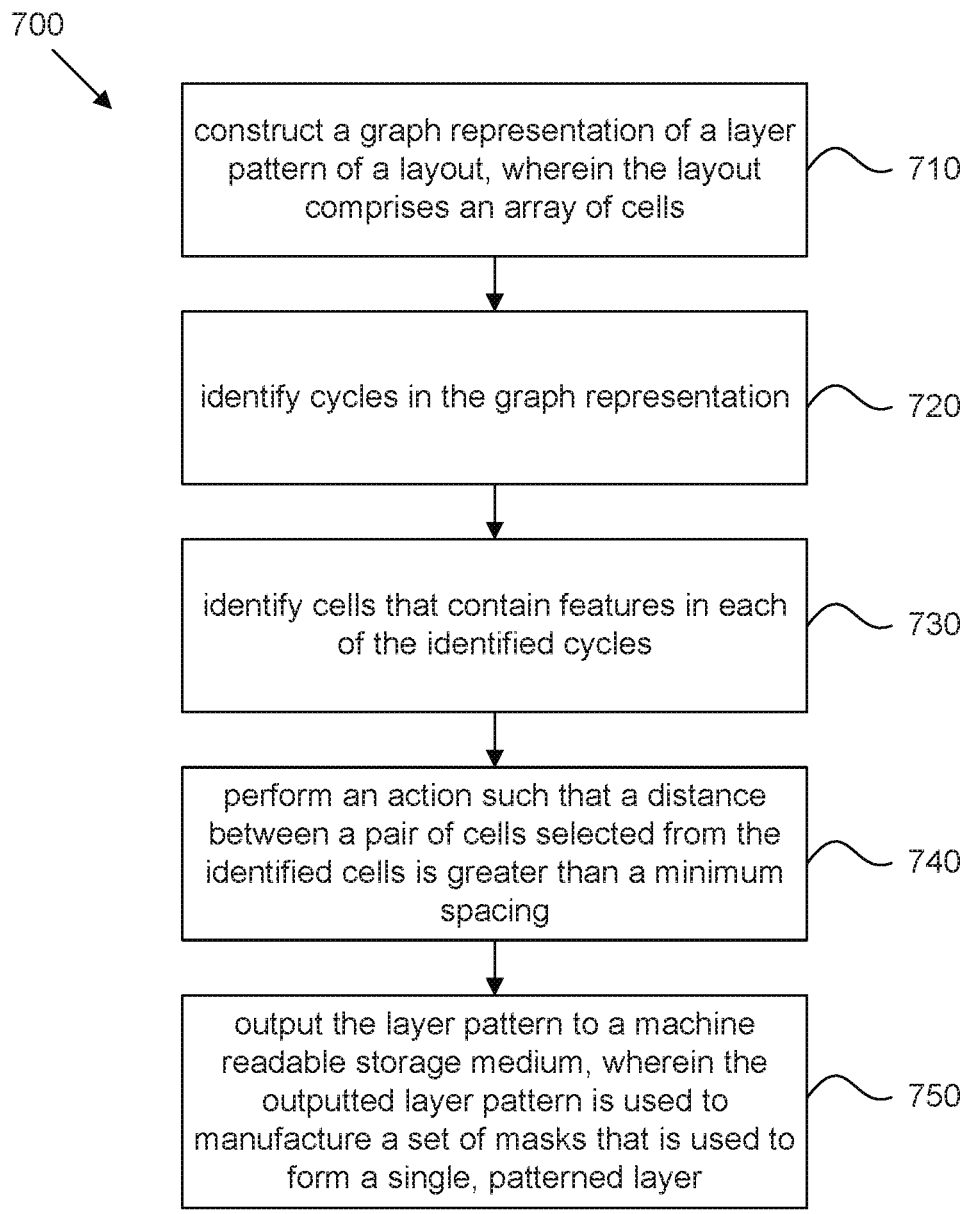
FIG. 7 is a flow diagram of an exemplary process for determining k-colorability of a layout comprising an array of cells and outputting k subsets of a layer pattern to a machine readable storage medium, in accordance with some embodiments.

FIG. 7 illustrates an example process 700 for determining k-colorability of a layout comprising an array of cells and outputting k subsets of a layer pattern to a machine-readable storage medium.

In operation 710, a graph representation of the layer pattern is constructed (see FIG. 5B). In operation 720, cycles in the graph representation are identified (e.g., the cycle that includes vertices 562, 564, 566, 568, 570, 572, 574, 576, 578, 580, 582, and 584, and edges 587 through 598 in FIG. 5B). In operation 730, cells that contain features in each of the identified cycles are identified. In operation 740, a distance between cells selected from the identified cells in operation 730 are changed such that the changed distances are greater than the MCS (see FIG. 6B). In operation 750, the graph representation is colored with the k number of colors. Subsets of the layer pattern are outputted to the machine readable storage medium. The outputted data is then used for manufacturing a set of masks that is used to form a single, patterned layer, wherein each subset of the layer pattern represents a separate mask pattern and comprises features of the layer pattern corresponding to a color in the colored graph representations generated in operation 750.

Third Exemplary Embodiment

Figure 8A:
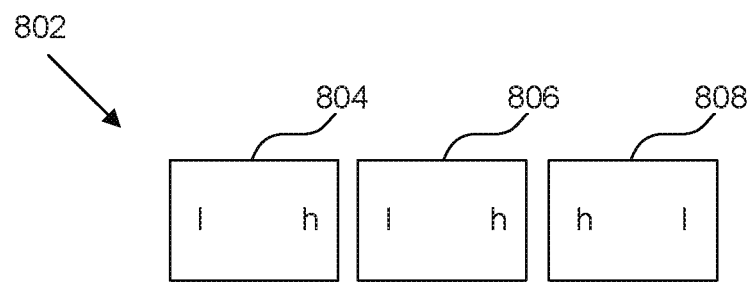
FIG. 8A illustrates a row of cells, in accordance with some embodiments.

FIG. 8A illustrates a row of cells 802, according to some embodiments. Row of cells 802 includes first cell 804, second cell 806, and third cell 808. The layout of a cell may be such that a first side, i.e., cell boundary, of the cell, in a row direction, may have more or fewer features within a distance equal to half the MCS than an opposing side, i.e., cell boundary. The side of each cell that has a higher number of features within half the MCS of a cell boundary is designated as a high-count side, while the opposing side to the high-count side is designated as a low-count side. In FIG. 8A the low-count side is labeled "1" and the high-count side is labeled "h."

In row of cells 802, the high count side of first cell 804 abuts with low-count side of second cell 806, and high-count side of second cell 806 abuts with high-count side of third cell 808. Since two high-count sides of second and third cells abut each other, a layout that includes row of cells 802 may have a higher likelihood of being non k-colorable.

Figure 8B:
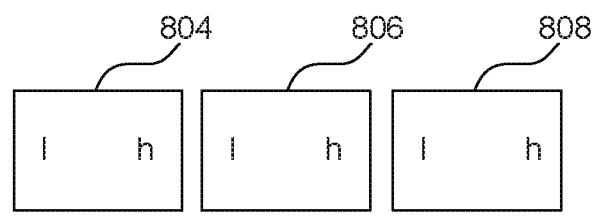
FIG. 8B illustrates a row of cells similar to the row of cells of FIG. 8A, except that a cell is horizontally flipped, in accordance with some embodiments.

The likelihood of the layout not being k-colorable may be lowered by rearranging the cells such that low-count side of each cell abuts with a high-count side of an adjacent cell, and high-count side of each cell abuts with a low-count side of another adjacent cell. For example, third cell 808 of FIG. 8A may be flipped, as illustrated in FIG. 8B. After the flipping of third cell 808, all low-count sides abuts with a high count side and all high-count sides abuts with a low-count side. Alternatively, third cell 808 may be replaced with an alternative version of third cell 808 or another cell, the features of which are all a greater distance from the cell boundary than half of the MCS.

Figure 9:
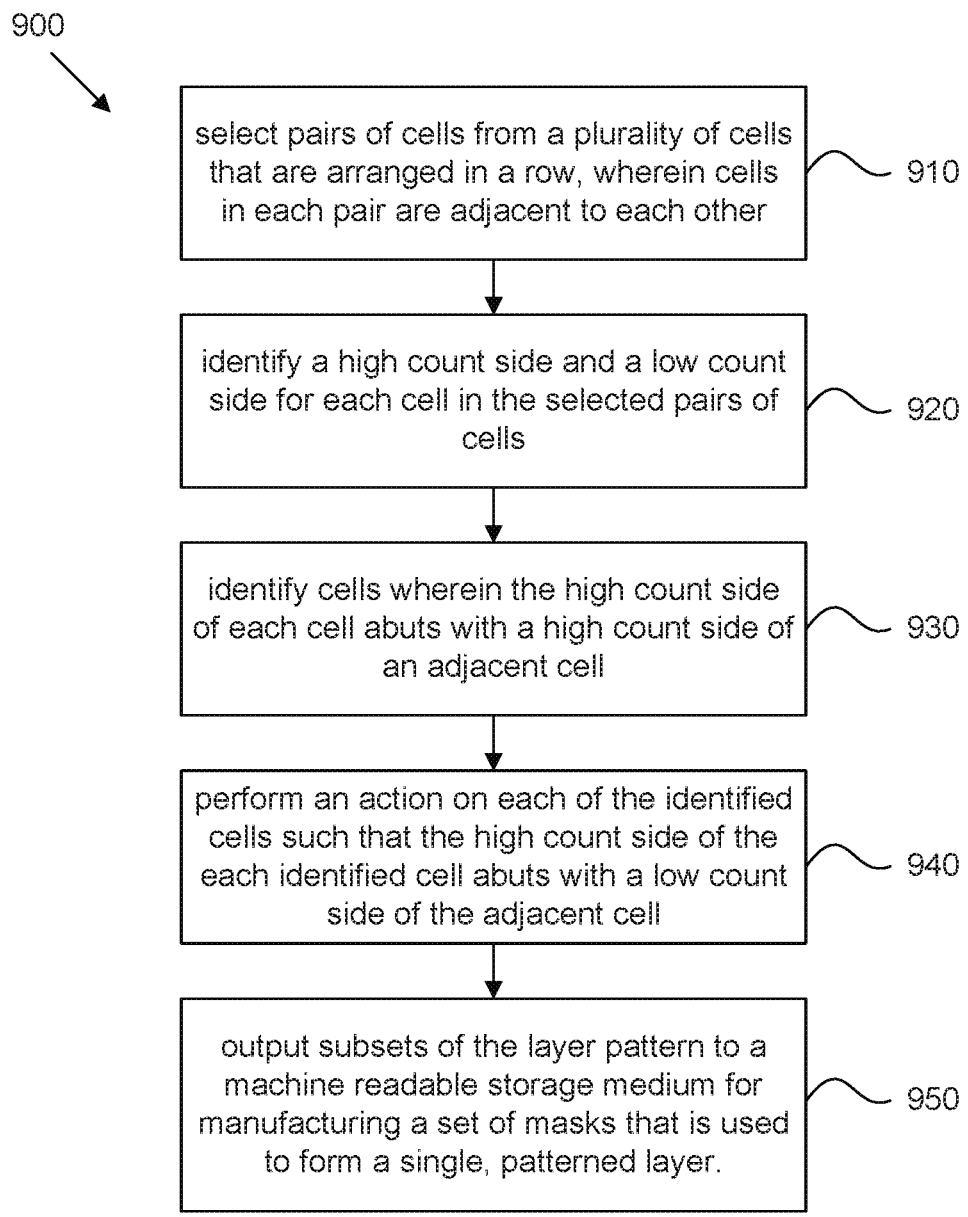
FIG. 9 is a flow diagram of an exemplary process for optimizing a layout comprising a plurality of cells arranged in a row, in accordance with some embodiments.

FIG. 9 illustrates an example process 900 for optimizing a layout comprising a plurality of cells arranged in a row. In operation 910, a cell is selected from a plurality of cells that are arranged in a row. In operation 920, a high count side and a low count side are identified for each cells selected in operation 910. In operation 930, cells that have the high count side abutting with a high count side of an adjacent cell are identified. In operation 940, cells that have the low count side abutting with a low count side of an adjacent cell are identified. In operation 950, an action is performed on each of the identified cells such that the high count side of the each identified cell abuts with a low count side of the adjacent cell. In operation 960, subsets of the layer pattern are outputted to the machine readable storage medium for manufacturing a set of masks that is used to form a single, patterned layer.

Figure 10:
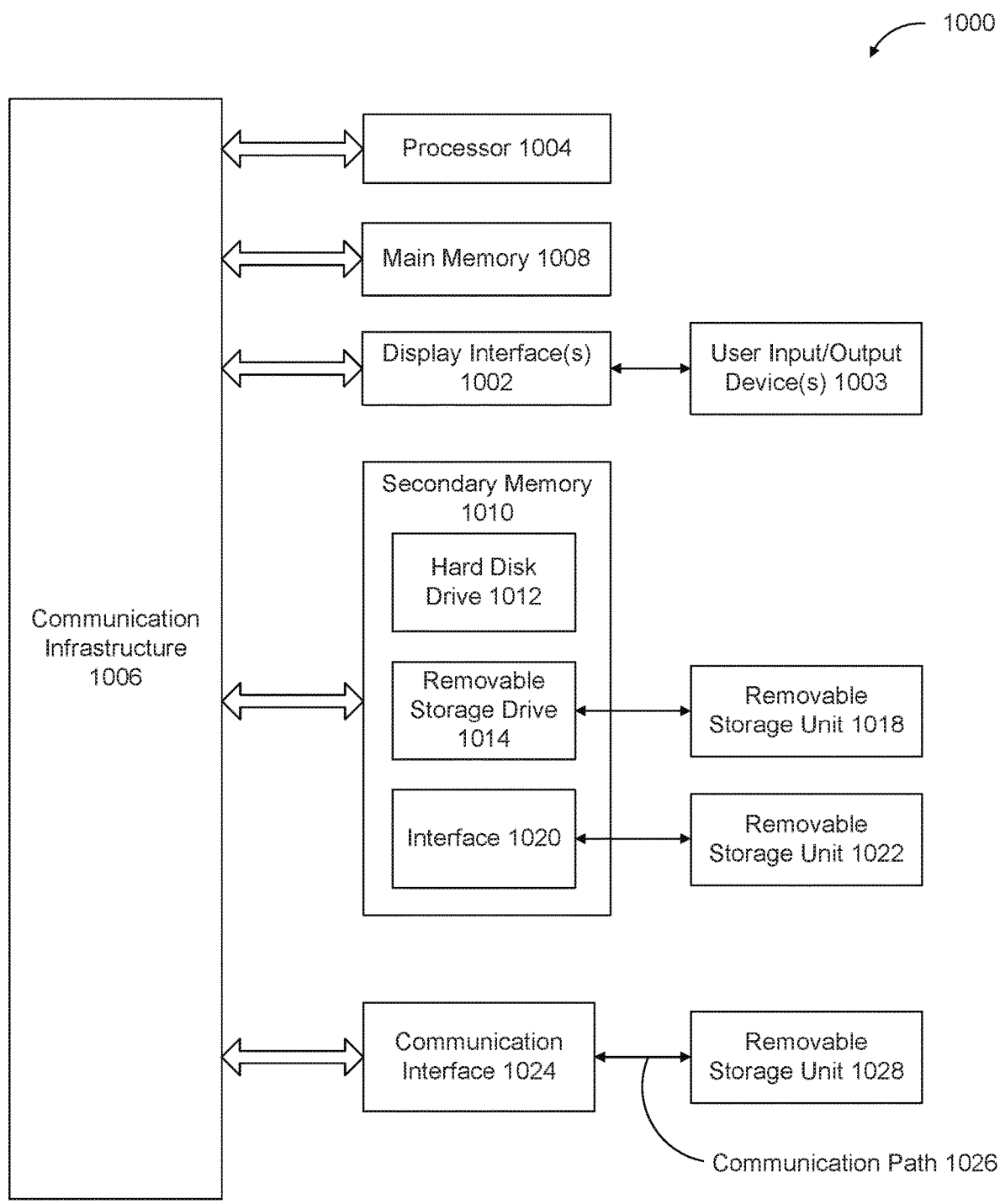
FIG. 10 is a block diagram of an exemplary computer system in which embodiments of the present disclosure, or portions thereof, can be implemented as computer-readable code.

Various aspects of the present invention may be implemented in software, firmware, hardware, or a combination thereof. FIG. 10 is a block diagram of an exemplary computer system 1000 in which embodiments of the present disclosure, or portions thereof, can be implemented as computer-readable code. For example, the methods illustrated by processes 400 of FIG. 4, 700 of FIG. 7, and 900 of FIG. 9 can be implemented in system 1000. Various embodiments of the present disclosure are described in terms of computer system 1000. After reading this description, it will become apparent to a person skilled in the relevant art how to implement embodiments of the present disclosure using other computer systems and/or computer architectures.

It should be noted that the simulation, synthesis and/or manufacture of various embodiments of this disclosure may be accomplished, in part, through the use of computer-readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any computer-readable medium including a semiconductor, magnetic disk, and/or optical disk (such as CD-ROM, DVD-ROM). As such, the code can be transmitted over communication networks including the Internet. The functions accomplished and/or structure provided by the systems and techniques described above can be represented in a memory.

Computer system 1000 includes one or more processors, such as processor 1004. Processor 1004 is connected to a communication infrastructure 1006 (e.g., a bus or network).

Computer system 1000 also includes a main memory 1008, such as random access memory (RAM), and may also include a secondary memory 1010. Secondary memory 1010 can include, for example, a hard disk drive 1012, a removable storage drive 1014, and/or a memory stick. Removable storage drive 1014 can include a floppy disk drive, a magnetic tape drive, an optical disk drive, a flash memory, or the like. Removable storage drive 1014 reads from and/or writes to a removable storage unit 1018 in a well-known manner. Removable storage unit 1018 can include a floppy disk, magnetic tape, optical disk, flash drive, etc., which is read by and written to by removable storage drive 1014. As will be appreciated by persons skilled in the relevant art, removable storage unit 1018 includes a computer-readable storage medium having stored therein computer software and/or data. Computer system 1000 includes a display interface 1002 (which can include input and output devices 1003 such as keyboards, mice, etc.) that forwards graphics, text, and other data from communication infrastructure 1006 (or from a frame buffer not shown).

In alternative implementations, secondary memory 1010 can include other similar devices for allowing computer programs or other instructions to be loaded into computer system 1000. Such devices can include, for example, a removable storage unit 1022 and an interface 1020. Examples of such devices include a program cartridge and cartridge interface (such as those found in video game devices), a removable memory chip (e.g., EPROM or PROM) and associated socket, and other removable storage units 1022 and interfaces 1020 which allow software and data to be transferred from the removable storage unit 1022 to computer system 1000.

Computer system 1000 can also include a communications interface 1024. Communications interface 1024 allows software and data to be transferred between computer system 1000 and external devices. Communications interface 1024 can include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and can be implemented using wire or cable, fiber optics, a phone line, a cellular phone link, a RF link or other communications channels.

In this document, the terms "computer program storage medium" and "computer-readable storage medium" are used to generally refer to non-transitory media such as removable storage unit 1018, removable storage unit 1022, and a hard disk installed in hard disk drive 1012. Computer program storage medium and computer-readable storage medium can also refer to memories, such as main memory 1008 and secondary memory 1010, which can be semiconductor memories (e.g., DRAMs, etc.). Embodiments of the present disclosure can employ any computer-readable medium, known now or in the future. Examples of computer-readable storage media include, but are not limited to, non-transitory primary storage devices (e.g., any type of random access memory), and non-transitory secondary storage devices (e.g., hard drives, solid-state drives, floppy disks, CD ROMS, ZIP disks, tapes, magnetic storage devices, optical storage devices, MEMS, nanotechnology-based storage devices, etc.).

These computer program products provide software to computer system 1000. Embodiments of the present disclosure are also directed to computer program products including software stored on any computer-readable storage medium. Such software, when executed in one or more data processing devices, causes a data processing device(s) to operate as described herein.

Computer programs (also called computer control logic) are stored in main memory 1008 and/or secondary memory 1010. Computer programs may also be received via communications interface 1024. Such computer programs, when executed, enable computer system 1000 to implement embodiments of the present disclosure. In particular, the computer programs, when executed, enable processor 1004 to implement processes of embodiments of the present disclosure. The operations in the methods illustrated by processes 400 of FIG. 4, 700 of FIG. 7, and 900 of FIG. 9 can be implemented in system 1000. Where embodiments of the present disclosure are implemented using software, the software can be stored in a computer program product and loaded into computer system 1000 using removable storage drive 1014, interface 1020, hard drive 1012, or communications interface 1024.

Figure 11:
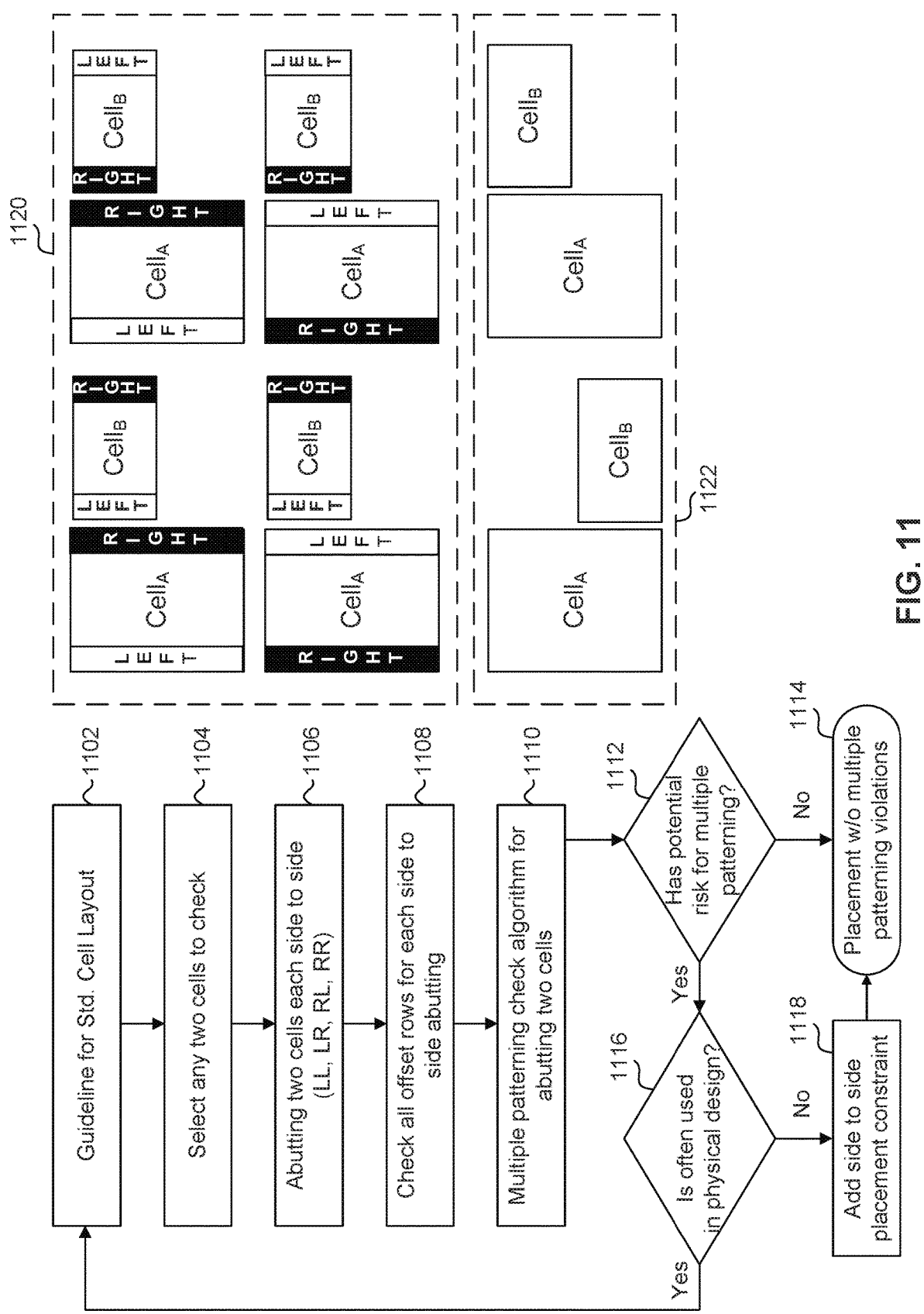
FIG. 11 illustrates a multiple patterning handling flow.

FIG. 11 illustrates an exemplary multiple patterning flow. At operation 1104, two cells from a library of cells are selected to be checked for potential cell-to-cell multiple patterning violations. At operation 1106, the two selected cells are placed in each of four placement combinations such that they are adjacent to each other in an abutting manner. Because each of the two selected cells has a left side and a right side, the abutting placement combinations are left/left (LL), left/right (LR), right/left (RL), and right/right (RR) as shown in block 1120. At operation 1108 the various placement combinations of the selected cells are further arranged, as shown in block 1122, so that offset row placement variations can be examined for potential cell-to-cell multiple patterning violations. At operation 1110, processing is performed to examine the cells placed for multiple patterning issues. This processing is typically performed software running on a computer and having access to a digital representation of the cell placement combinations. Alternatively, such processing may be performed by suitable logic hardware with without software. At operation 1112, if no potential risk for multiple patterning violations is found then, at operation 1114, any abutting placement of the two selected cells can be made in a chip design layout without creating the tested for cell-to-cell multiple patterning violations. However, if at operation 1112 potential risk for cell-to-cell multiple patterning violation is found, then, at operation 1116, it is further determined whether these cells are used frequently enough such that revised versions of those cells should be created. If the determination at operation 1116 is affirmative, then at operation 1102, the layout of the selected cells is modified in accordance with the semiconductor manufacturer's design rules and guidelines for standard cell layout such that the modified versions of the selected cells may then be included in a cell library, such as for example, a standard cell library. However, if the determination at operation 1116 is negative, then at operation 1118, a side-to-side placement constraint is added so that placement of the selected cells is modified to include a distance between the selected cells that is adequate to preclude cell-to-cell multiple patterning violations. The side-to-side placement constraint is information that is used by operation 1114. After the addition of the side-to-side placement constraint at operation 1118, the placement process is performed at operation 1114.

According to aspects of the present disclosure, a method for outputting a first number of subsets of a layer pattern comprising a plurality of cells arranged in a row includes selecting subsets of cells from the plurality of cells, constructing a graph representation for each subset of cells, identifying graph representations that are not colorable with the first number of labels, identifying subsets of cells that correspond to the identified graph representations, changing a distance between cells in each of the identified subset of cells, wherein the changed distances are greater than the first spacing, labeling the graph representations with the first number of labels, and outputting subsets of the layer pattern to the machine readable storage medium for manufacturing a set of masks that is used to form a single, patterned layer, wherein each subset of the layer pattern represents a separate mask pattern and comprises features of the layer pattern corresponding to a label in the labeled graph representations.

In a first embodiment, a method of outputting a first number of subsets of a layer pattern comprising a plurality of cells arranged in a row includes selecting subsets of cells from the plurality of cells; constructing a graph representation for each subset of cells; identifying graph representations that are not colorable with a first number of labels; identifying subsets of cells that correspond to the identified graph representations; performing an action such that a distance between cells in each of the identified subset of cells is greater than a first spacing; labeling the graph representations with the first number of labels; and outputting subsets of the layer pattern to the machine readable storage medium for manufacturing a set of masks that is used to form a single, patterned layer, wherein each subset of the layer pattern represents a separate mask pattern and comprises features of the layer pattern corresponding to a label in the labeled graph representations.

According to some embodiments, the layer pattern includes features representing contacts. According to some embodiments, performing an action includes replacing at least one of the cells in an identified pair of cells with an alternative cell. According to some embodiments, the alternative cell includes a layout with features spaced more than one half MCS from the cell boundaries. According to some embodiments, performing an action includes moving at least one of the cells in an identified pair of cells, i.e., changing the placement coordinates of at least one cell with respect to the other cell, such that the two cells are placed a greater distance apart. According to some embodiments, the first spacing is a minimum colorable spacing (MCS).

In a second embodiment, a method includes constructing a graph representation of a layer pattern of a layout, wherein the layout comprises an array of cells; identifying cycles in the graph representation; identifying cells that contain features in each of the identified cycles; performing an action such that a distance between a pair of cells selected from the identified cells is greater than a minimum spacing; and outputting the layer pattern to a machine readable storage medium, wherein the outputted layer pattern is used to manufacture a set of masks that is used to form a single, patterned layer.

In various embodiments, identifying cycles includes identifying cycles that have an odd number of vertices, the outputted layer pattern is used to manufacture two masks for double patterning, and performing includes moving at least one cell selected from the identified cells. In various embodiments, the pattern represents a middle of line (MOL)

layer pattern, and the MOL layer pattern may include features representing contacts or vias. In some embodiments, the array of cells has at least two columns.

In a third embodiment, a method includes selecting pairs of cells from a plurality of cells that are arranged in a row, wherein cells in each pair are adjacent to each other; identifying a high count side and a low count side for each cell in the selected pairs of cells; identifying cells wherein the high count side of each cell abuts with a high count side of an adjacent cell; performing an action on each of the identified cells such that the high count side of each identified cell abuts with a low count side of the adjacent cell; and outputting subsets of the layer pattern to a machine readable storage medium for manufacturing a set of masks that is used to form a single, patterned layer.

In various embodiments, performing includes flipping each identified cell. In other embodiments, performing includes replacing each identified cell with an alternative version of the identified cell. In some embodiments, identifying the high count side and the low count side includes counting a first number of features that are separated from a first edge of each cell by half of the minimum spacing, and counting a second number of features that are separated from a second edge of each cell by half of the minimum spacing. In various embodiments, performing an action includes replacing each identified cell with another cell. In other embodiments, performing an action includes regenerating each identified cell with another set of parameters.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   constructing, by a processor in a computer system, a graph representation of a layer pattern of a layout, that comprises an array of cells;
   identifying, by the processor, cycles in the graph representation;
   identifying, by the processor, cells that contain features in each of the identified cycles;
   modifying, by the processor, the layer pattern by adjusting a spacing between a pair of cells selected from the identified cells to a value greater than a minimum spacing; and
   outputting, by the processor, the modified layer pattern to a machine readable storage medium, via a communications infrastructure of the computer system, for use in manufacturing a set of masks suitable to form a patterned layer.

2. The method of claim 1, wherein the identifying the cycles comprises identifying cycles that have an odd number of vertices.

3. The method of claim 2, wherein the vertices represent features in the cells.

4. The method of claim 2, wherein the outputted layer pattern is used to manufacture two masks for double patterning.

5. The method of claim 1, wherein the adjusting the spacing comprises relocating at least one cell selected from the identified cells.

6. The method of claim 1, wherein the layer pattern represents a middle-of-line (MOL) layer pattern.

7. The method of claim 6, wherein the MOL layer pattern comprises features representing contacts.

8. The method of claim 1, wherein the array of cells has at least two columns.

9. The method of claim 1, further comprising, prior to the outputting the layer pattern, determining whether the graph representation can be decomposed into a k number of masks to form the set of masks.

10. The method of claim 1, wherein the graph representation of the layer pattern comprises one or more closed loops and the modified layer pattern does not comprise closed loops.

11. The method of claim 1, wherein the graph representation of the layer pattern comprises a closed loop, and wherein the modifying the layer pattern comprises converting the closed loop to an open shape.

12. A method, comprising:
   generating, by a processor in a computer system, a graph representation of a layer pattern, the graph representation having vertices that correspond to features within cells of the layer pattern;
   coloring, by the processor, the vertices of the graph representation according to a graph coloring algorithm that assigns different colors to adjacent vertices;
   determining, by the processor, k-colorability of the layer pattern based on coloring the vertices of the graph representation;
   outputting, by the processor, k subsets of the layer pattern according to the determined k-colorability; and
   storing, by the processor, each of the k subsets to a machine readable medium, via a communications infrastructure of the computer system, for manufacturing a set of k photolithography masks, for use in forming a layer during a semiconductor manufacturing process.

13. The method of claim 12, wherein the layer pattern comprises three or more cells.

14. The method of claim 13, wherein the graph representation represents one or more cells in the layer pattern.

15. The method of claim 13, further comprising, in response to the determined k-colorability exceeding 3-colorability:
   inserting a gap between cells of the layer pattern; and
   repeating the generating, coloring, and determining.

16. A method, comprising:
   generating, by a processor in a computer system, a plurality of graph representations of a layer pattern, each graph representation corresponding to a subset of the layer pattern and having vertices that correspond to features within cells of the layer pattern;
   coloring, by the processor, the vertices of each of the plurality of graph representations according to a coloring algorithm that assigns different colors to adjacent vertices;
   outputting, by the processor, k subsets of the layer pattern according to a k-colorability determined from coloring the vertices of each of the plurality of graph representations; and
   storing, by the processor, each of the k subsets to a machine readable medium, via a communications infrastructure of the computer system, for manufacturing a set of k photolithography masks, for use in forming a layer during a semiconductor manufacturing process.

17. The method of claim 16, wherein the coloring the vertices comprises assigning labels, the labels comprising one or more of colors, numbers, texts, and symbols.

18. The method of claim 16, wherein the determined k-colorability indicates a number of k photolithography masks for use in forming the layer.

19. The method of claim 16, wherein a minimum number k is used for outputting and storing subsets of the layer pattern.

20. The method of claim 16, wherein the layer pattern comprises polygonal features, and wherein the generating the plurality of graph representations of the layer pattern comprises executing a fracturing algorithm on the polygonal features.

* * * * *